United States Patent
Augusteijn et al.

(10) Patent No.: US 6,292,883 B1
(45) Date of Patent: *Sep. 18, 2001

(54) CONVERTING PROGRAM-SPECIFIC VIRTUAL MACHINE INSTRUCTIONS INTO VARIABLE INSTRUCTION SET

(75) Inventors: Alexander Augusteijn; Eelco J. Dijkstra; Paulus M. H. M. A. Gorissen; Franciscus J. H. M. Meulenbroeks, all of Eindhoven (NL); Paul Stravers, San Jose, CA (US); Joachim A. Trescher, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/161,847

(22) Filed: Sep. 28, 1998

(30) Foreign Application Priority Data

| Oct. 2, 1997 | (EP) | 97203033 |
|---|---|---|
| Dec. 12, 1997 | (EP) | 97203905 |

(51) Int. Cl.[7] ............................................. G06F 9/45
(52) U.S. Cl. ........................... 712/209; 712/227; 709/1; 709/102; 717/206
(58) Field of Search ........................... 703/26; 712/211, 712/230, 243, 212, 208, 209, 220, 227; 711/125; 710/260; 717/5; 709/1, 102; 345/335; 707/206

(56) References Cited

U.S. PATENT DOCUMENTS

| 4,245,302 | * | 1/1981 | Amdahl | 712/243 |
| 4,403,284 | * | 9/1983 | Sacarisen et al. | 712/230 |
| 4,633,390 | * | 12/1986 | Yoshida | 712/211 |
| 4,719,565 | * | 1/1988 | Moller | 710/260 |
| 5,430,862 | * | 7/1995 | Smith et al. | 703/26 |
| 5,925,123 | * | 7/1999 | Tremblay et al. | 712/212 |
| 6,021,273 | * | 2/2000 | Griesemer | 717/5 |
| 6,021,469 | * | 2/2000 | Tremblay et al. | 711/125 |
| 6,078,322 | * | 6/2000 | Simonoff et al. | 345/335 |
| 6,151,618 | * | 11/2000 | Wahbe et al. | 709/1 |

FOREIGN PATENT DOCUMENTS

| WO 9723823 | 7/1997 | (WO) | G06F/9/00 |
| WO 9727537 | 7/1997 | (WO) | G06F/9/318 |

OTHER PUBLICATIONS

"Optimizing and ANSI C Interpreter with Superoperators", Todd. A. Proebsting, POPL '95:322–332, 1/95.
"A Prolog Pre-processor for Warren's Abstract Instruction Set" by B. Knodler et al, Microprocessing and Microprogramming 18 (1986) pp. 71–81.

* cited by examiner

*Primary Examiner*—Meng-Al T. An
*Assistant Examiner*—Wen Tai Lin (57) ABSTRACT

A source program is executed on microcontroller core 114 of a processing unit 100. The core 114 is capable of native instructions from a predetermined set of micro-controller specific instructions. In a pre-processing step, for the program statements of the source program a program-specific virtual machine is defined with a corresponding set of virtual machine instructions, such that the expression of the program statements in the sequence of instructions requires less storage space compared to using only native instructions. For the program-specific virtual machine an associated conversion means 132 is defined for converting the program-specific virtual machine instructions into the native instructions of the core 114. The source program statements are expressed in a sequence of instructions comprising instructions of the defined virtual machine. The sequence of instructions is stored in an instruction memory 120. The conversion means 114 is represented in the processing unit 100. During execution, instructions are fetched from the instruction memory 120. The conversion means 114 is used to convert the fetched virtual machine instructions into native instructions for execution by the core 114.

12 Claims, 4 Drawing Sheets

CONVERTING PROGRAM-SPECIFIC VIRTUAL MACHINE INSTRUCTIONS INTO VARIABLE INSTRUCTION SET

BACKGROUND OF THE INVENTION

The invention relates to a method for executing a source program on a processing unit comprising a predetermined microcontroller core for executing native instructions from a predetermined set of micro-controller specific instructions; the method comprising:
- a pre-processing step of expressing program statements of the source program in a sequence of instructions comprising virtual machine instructions; and storing the sequence of instructions in an instruction memory; and
- an execution step of fetching instructions from the instruction memory; using conversion means of the processing unit to convert virtual instructions fetched from the instruction memory into native instructions; and feeding the native instructions to the microcontroller core for execution.

The invention further relates to a processing unit for executing instructions of a virtual machine, the instructions being referred to as virtual machine instructions; the processing unit comprising:
- a predetermined microcontroller core for executing native instructions from a predetermined set of micro-controller specific instructions; the native instructions being different from the virtual machine instructions;
- an instruction memory for storing instructions including at least one of the virtual machine instructions;
- a converter comprising conversion means for converting a virtual machine instruction fetched from the instruction memory into at least one native instruction for execution by the microcontroller core.

Increasingly, source programs are expressed in (compiled to) instructions of a virtual machine instead of native instructions of a microcontroller core on which the program is to be executed. A main reason for using a virtual machine is portability of programs between different machines (platforms). A program expressed in the virtual machine instructions of the virtual machine can be executed relatively easily on several concrete machines, using suitable interpreters operating on those machines. At this moment a driving force for using portable programs is Java, where Java programs are exchanged via Internet and can be executed on different native machines using processors with different instruction sets. Using a compiler, Java programs are expressed in Java byte codes (JBCs), which form the instructions of the Java Virtual Machine. The resulting code is usually referred to as a Java applet.

Conventionally, programs expressed in virtual machine instructions are executed by means of software interpretation. The processor (CPU) executes a special interpreter program, where in a loop the processor fetches a virtual machine instruction, decodes it into a sequence of native instructions of the microcontroller core of the processor and executes each native instruction. This technique is slow and requires an additional interpreter program, which can be relatively large. To improve the execution speed, the so-called Just-In-Time (JIT) compilation technique is used. Just before starting execution of software module expressed in virtual machine instructions, the module is compiled to native code (i.e., expressed in native machine instructions). In this way, the module needs to be stored twice in addition to the code for the compiler. The additional storage requirements of software interpretation are not desired for embedded systems. To avoid performance and storage overhead, it is preferred to use a hardware interpreter. In itself a hardware interpreter is known in the form of a Prolog pre-processor for Warren's abstract instruction set. In the paper "A Prolog pre-processor for Warren's abstract instruction set" by B. Knödler and W. Rosenstiel, Microprocessing and Microprogramming 18 (1986) pages 71–81, a pre-processor is described for interpreting programs written in the Prolog programming language on a Motorola 68000 processor (MC68000). A compiler is used to translate the Prolog source program into instructions, which have been defined by Mr. Warren and which are generally used for executing Prolog programs. The set of Warren instructions forms a virtual machine designed for executing Prolog programs. The sequence of Warren instructions resulting from the compilation are loaded into RAM and executed by the MC68000 with the aid of the pre-processor. After power-on, the MC68000 first performs a booting procedure by executing native MC68000 instructions. At the end of the booting procedure, the MC68000 is ready to initiate the execution of a Prolog program. This is started by jumping to a predetermined address range. The pre-processor is a memory-mapped device, which is mapped to this range. When the pre-processor is addressed it reads a Warren instruction (of the translated Prolog program) from its own RAM, adaptively synthesizes a sequence of MC68000 instructions and constants and sends these directly to the CPU for execution. The MC68000 instructions for each Warren instruction are stored in ROM of the pre-processor. In general, the pre-processor translates one Warren instruction into a sequence of MC68000 instructions. The pre-processor contains its own RAM controller and ROM controller, which generate the addresses for the RAM and ROM of the pre-processor. The RAM controller manages the RAM instruction pointer. Each successive read operation of the MC68000 results in the pre-processor sending the next instruction (and optional constants) of the sequence to the CPU. If the sequence has been completed, a next read operation results in the first instruction of the sequence corresponding to the next Warren instruction of the program being send to the CPU. The known pre-processor supports one virtual machine (the Warren machine).

SUMMARY OF THE INVENTION

It is an object of the invention to provide a method and processing unit of the kind set forth which is more flexible. It is a further object of the invention to provide a method and processing unit of the kind set forth wherein the program is represented in a more compact form.

To meet the object of the invention, the method is characterised in that the method comprises the steps of defining for the program statements of the source program a program-specific virtual machine with a corresponding set of virtual machine instructions, such that the expression of the program statements in the sequence of instructions requires less storage space in the instruction memory compared to using only native instructions for expressing the program statements;
- defining for the program-specific virtual machine an associated conversion means for converting virtual machine instructions of the program-specific virtual machine into native instructions of the microcontroller core; and
- representing the associated conversion means in the processing unit. According to the invention, a program-specific virtual machine is defined for a program such that the program can be expressed in a form which is more compact than if the program was expressed in native instructions of the core. Also an associated conversion means is defined. The conversion means may for instance be implemented using a conversion table or microcode stored in ROM or dedicated logic, such as a PLD. The defined conversion means is represented in the processing unit. In this way, fast execution of the program is maintained, whereas at the same time a compact representation is achieved. This method is particularly suitable for use with embedded applications. In this case, the source program relates to all program statements initially represented in the embedded system (for instance, the program present in the system when the user purchases the system). The program may be stored in a permanent memory, such as ROM, or stored in a reprogrammable memory, such as EEPROM. For embedded applications it is highly desired that the code used to represent the embedded application program is compact and that the performance in executing the code is good. Typically, processing units used for embedded applications are based on a family concept, where for a specific application a processing unit is created from a given microcontroller core and I/O or storage components required for the application. It is desired to make no or at least no significant modifications to the core or the components in order to reduce costs. According to the invention, on the one hand virtual machine instructions are defined specifically for the program, giving full flexibility in achieving code compaction, whereas on the other hand an off-the-shelf core is used for executing the program. The required conversion from virtual machine instructions to native instructions is performed by a conversion means, which can be seen as a kind of preprocessor.

The article "Optimizing an ANSI C Interpreter with Superoperators", Todd A. Proebsting, POPL'95:322–332, 1/95 describes the use of superoperators as an optimisation technique for byte coded interpreters. As a first step a compiler is used to express the program in virtual machine instructions. The virtual machine instruction are chosen such that the representation of the program using the virtual machine instructions is more compact. An example of such a virtual machine is a stack machine, which is known for its compact representation. Next, sequences of virtual machine instructions which occur frequently in the compiled code are identified and replaced by newly defined additional virtual machine instructions, where, for instance, one new instruction (a so-called superoperator) replaces a sequence of four existing instructions. A superoperator can also be defined, by during the parsing phase of the compiler, identifying most frequently occurring terms in the expression tree which is built during an intermediate representation in the compiler. Only a limited number of superoperators are defined, e.g., well less than 256. This allows a compact encoding of the superoperators (e.g., using a single byte code). Part of the code range is then assigned for representing the original virtual machine instructions and part of the range is used for representing newly added virtual machine instructions representing the superoperators. By using only 20 superoperators already a significant code compaction can be achieved. The virtual machine instructions are interpreted using a software interpreter running on a MIPS R3000 or SPARC processor. No use is made of a hardware interpreter which in combination with a given embedded microcontroller core provides code compaction of a given embedded application program without a performance penalty.

In an embodiment of the invention, a good level of code compaction can be achieved for different groups of program statements. Preferably, program statements relating substantially to a same subset of native instructions are grouped together and a virtual machine is defined for such a group. For instance, a different virtual machine may be defined for integer operations than for floating point operations. It is preferred to group program statements which relate to substantially the same subset of native instructions but use the instructions at a substantially differing frequency, allowing the definition of special virtual machine instructions for the most frequently occurring (sequences of) instructions. For a multi-tasking system, preferably program statements of one task are associated with one virtual machine. This simplifies development of the embedded program, since usually program statements for one task are produced under supervision of one engineer and in this approach the supervisory role can be extended to include the supervision over the production of compacted code and an associated conversion means. Depending on the chosen implementation, selection of the conversion means associated with the virtual machine instruction to be executed could incur a delay of the execution. Instead of then selecting a conversion means for individual virtual machine instruction, the overhead may be reduced by switching the conversion means as part of the task switching. As long as then the same tasks executes uninterrupted, no overhead is involved in selecting the appropriate conversion means. It will be appreciated that the same virtual machine may also be used for several tasks which use a similar mix of native instructions in a similar frequency. On the other hand, if the program for a task comprises more than one program module, where at least two of the program modules relate substantially to different subsets of native instructions or use instructions of a similar subset of instructions in substantially different frequencies, then it is preferred to use different virtual machines for those modules. Similarly, if an object-oriented programming technique is used, a virtual machine may be defined for each or a group of similar objects.

In another embodiment, an instruction module and conversion data for converting the instructions of the module to native instructions is received. For instance, the processing unit may be supplied with an additional or replacement program module. The supply may be local, e.g., by adding or replacing a ROM with the program module, or loading the program module from a portable storage medium, such as a floppy disk, into a programmable memory. The supply may also take place via a network, either a local area network or a wide area network, such as Internet. Increasingly, it is desired that embedded systems are 'open' to accept additional software or software which replaces part of the existing software at a stage after the initial programming of the system. Where the initial software was optimally compressed using a dedicated virtual machine, using this machine for the newly received code will not always give good results or could even be impossible. Even, if the supplier of the original software also supplies the new software, the nature of the software may be different, implying that a better compaction can be achieved by defining a separate virtual machine for the new software. Increasingly, the received software will be of an entirely different nature than the original software. As an example, the new software may be a Java applet expressed in Java bytecodes, whereas the original software was written in "C" and optimally compiled to a virtual machine matching the original program together with a corresponding conversion means. It will be understood that the defined conversion means can not be used for converting the Java bytecodes since these codes are expressed using a different virtual machine.

To meet the object of the invention, the processing unit is characterised in that the converter is operative to perform the conversion for a plurality of different virtual machines.

For instance, an embedded system may initially be supplied with an embedded program expressed using one virtual machine, which preferably is defined for the specific program. At a later stage a software update is required, replacing substantially all or a part of the software or adding a software module. For the entire application program which is then created it may be desired to use a new virtual machine which better reflects the then valid program (which may still contain parts of the old program as well). Particularly, since the required amount of software tends to grow over time a higher level of code compaction (reflected by a different virtual machine) may be required for the newly created application program. In this way, different virtual machines are used over time, where at each moment in time only one virtual machine is used. Alternatively, as described above, different virtual machines may be used at the same time for different parts of an embedded application program. Different virtual machines may also be used for programs of a different origin, such an embedded program written in "C" and compacted using a program-specific virtual machine and an program, such as a Java applet, expressed using a different and usually predetermined virtual machine. It will be appreciated that also multiple virtual machines may be present in the processing unit at the same time, where over time new virtual machines are added or existing virtual machines are replaced.

In an embodiment of the processing unit, the conversion means is of a re-programmable type. This allows 'downloading' of a new conversion means into the processing unit whenever a new program is loaded. The re-programmable conversion means may, for instance, be implemented using a re-programmable conversion table or microcode, e.g., stored in (E)EPROM, or using dedicated re-programmable logic, such as an E-PLD.

In an embodiment of the processing unit, the converter comprises dedicated conversion means for each one of the virtual machines. In this embodiment, the processing unit is created with several dedicated conversion means. In principle it is possible to use one large virtual machine with one corresponding conversion means. By using several virtual machines more compact code can be achieved. For instance, assume that an embedded program is formed by two program modules of which one module is mainly involved with user interface aspects of the embedded system, requiring mainly native integer instruction, whereas the second module is mainly involved with signal processing, requiring mainly floating point instructions. Assuming further that optimal virtual machines for each of the two modules comprise 256 virtual machine instructions each, the program modules are expressed using 8-bit codes. One virtual machine covering both modules can be made by combining the instruction of the two virtual machines, giving up to 512 virtual machine instructions (at least more than 256). Consequently, the code size will increase since now 9-bit codes are required. Such an increase can usually not be compensated by the fact that a combined conversion table may be smaller than two separate conversion table, due to a possible overlap in instructions.

In an embodiment of the processing unit, the converter distinguishes between conversion means for different virtual machines based on the location in the instruction memory where the virtual instruction to be executed is stored. For instance, if besides native instructions also virtual machine instructions of two different virtual machines are used, the memory may be subdivided into three regions; one region for each type of instruction. By determining in which region the address of the instruction to be executed lies, the converter can easily detect whether or not conversion is required (native instruction need not be converted) and which conversion means should be used for the conversion.

In an embodiment of the processing unit, a separate indicator (e.g., one or more bits) is used to differentiate between the native and the virtual machine and/or between different virtual machines. A separate indicator may be used for each instruction. Alternatively, one global indicator (e.g., a register) may be used which is set each time a change of machine occurs.

In an embodiment of the processing unit, one virtual machine instruction is converted into one corresponding native instruction, which is coded more compactly. In this way, the conversion can be very simple.

In an embodiment of the processing unit one virtual machine instruction is converted into a predetermined sequence of a plurality of native instructions, giving a further level of compaction. A sequencer is used to control the feeding of the sequence of native instructions to the microcontroller core, for instance by inhibiting an increment of the instruction pointer (program counter) of the microcontroller while the sequence is being fed and enabling an increment when a sequence has been completed. Alternatively, the processing unit comprises an instruction fetcher for fetching an instruction from the instruction memory under control of its own instruction counter. Whenever a sequence has been completed, changing of the counter is enabled, and the instruction counter is set to a different value in response to a change of an instruction pointer (program counter) of the microcontroller core. While a sequence is being processed, a change of value of the instruction counter is inhibited.

These and other aspects of the invention will be apparent from and elucidated with reference to the embodiments shown in the drawings.

DETAILED DESCRIPTION OF THE PRIMARY EMBODIMENT

FIG. 1 illustrates four possible architectural options of locating the converter in the processing unit 100. Three main components of the processing unit 100, are the microcontroller 110, the instruction memory 120 and a pre-processor 130. The pre-processor 130 comprises the converter 132. In all shown figures the microcontroller 110 comprises the instruction memory 120 and the pre-processor 130. As such, the processing unit 100 is not shown explicitly. By combining all main elements in the microcontroller 110, which preferably is a one-chip device, optimum performance can be achieved. It will be appreciated that, if desired, the instruction memory 120 and/or the pre-processor 130 may be located outside the microcontroller 110, where the microcontroller bus 140 is extended outside the microcontroller 110 and, for instance, coupled to an external bus such as PCI.

The instruction memory 120 contains virtual machine instructions, such as instructions for a stack machine. The instruction memory may also be used for storing data. The invention is not limited to Harvard architecture, wherein data and instructions are separate. The microcontroller 110 comprises a processor 112 with a predetermined microcontroller core 114, referred to as a native machine, for executing native instructions from a predetermined set of microcontroller specific instructions. An example of a microcontroller suitable for executing embedded software is a RISC-type microcontroller, like the MIPS PR3001 range of microprocessors. The processor may comprise an instruction cache 116 for storing native instructions before executing the instructions. The native instructions of the microcontroller core 114 are different from the virtual machine instructions of the virtual machine. As such the microcontroller 110 is not able to directly execute virtual machine instructions stored in the instruction memory 120. In response to the processor 112 requesting an instruction, the pre-processor 130 issues the native instruction. In order to be able to generate the native instruction the pre-processor 130 may fetch a virtual machine instruction from the instruction memory 120 using fetching means 134. The converter 132 of the pre-processor 130 is used for converting a virtual machine instruction, fetched from the instruction memory 120, into at least one native instruction. In general, a virtual machine instruction is converted into a sequence of native instructions. The pre-processor 130 further comprises a feeding means 136 for feeding native instructions of the sequence to the microcontroller core 114 for execution. When executing a virtual machine program the microcontroller 110 in fact executes a native program generated by the pre-processor 130. Where normally an instruction pointer of the microcontroller 110 indicates the next instruction in the instruction memory 120 required by the microprocessor 110 to be executed next, now the instruction pointer indicates to the pre-processor 130 that a next native instruction is required (or a re-feeding of a previous instruction). Consequently, the pre-processor 130 manages an independent virtual machine instruction pointer indicating the current (or next) virtual machine instruction in the instruction memory 120. The microcontroller does not require (explicit) knowledge of the virtual machine instruction or the virtual machine instruction pointer.

Figure 1A:
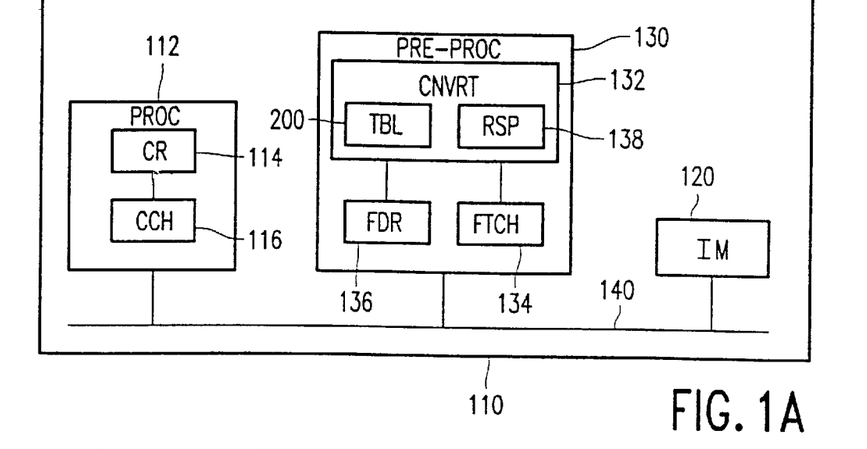
FIG. 1 illustrates four possible architectural options of locating the converter in the processing unit.

In FIG. 1A the main components of the processing unit are interconnected via a general peripheral interconnect bus 140, such as the PI bus. The pre-processor 130 is a peripheral on the bus. The pre-processor 130 may act as a memory-mapped peripheral, where a predetermined range of addresses is allocated to the pre-processor. In response to the processor 112 issuing on the bus 140 a request for an instruction with an address in this range, the pre-processor 130 issues the native instruction on the bus 140. When required, the pre-processor 130 fetches a virtual machine instruction from the instruction memory 120 via the bus 140.

Figure 1B:
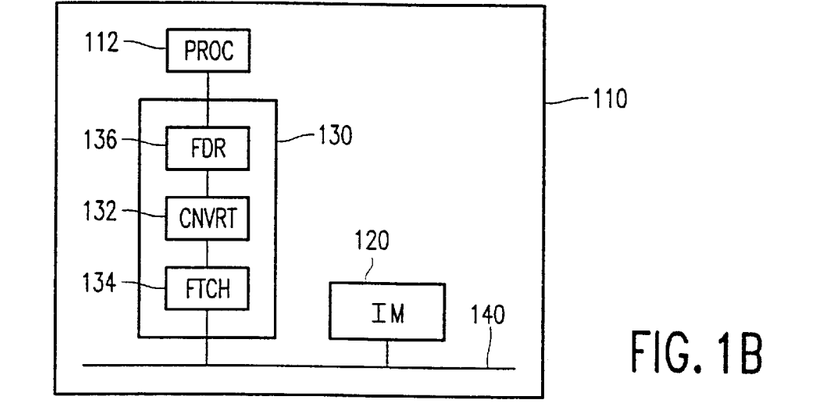
Figure 1C:
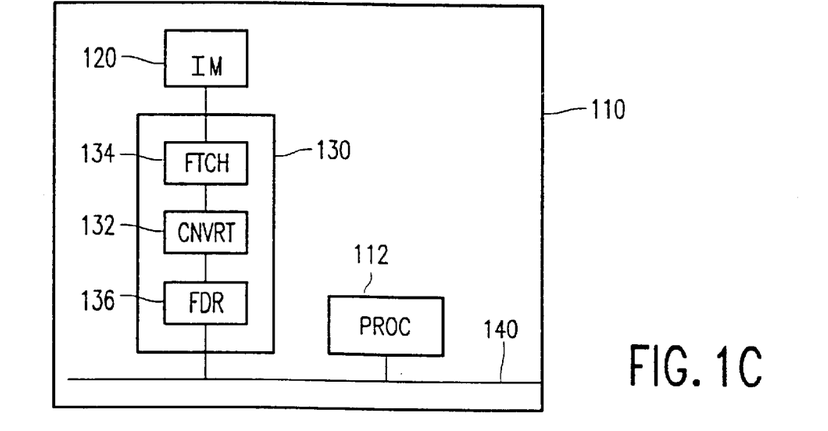

In FIGS. 1B and 1C, the pre-processor 130 is located in between the processor 112 and the instruction memory 120. If the pre-processor 130 needs to distinguish between native and virtual machine instructions, these configurations may delay execution of native instructions stored in the instruction memory 120. For reasons of clarity not all elements shown in FIG. 1A are repeated in FIGS. 1B, 1C and 1D.

Figure 1D:
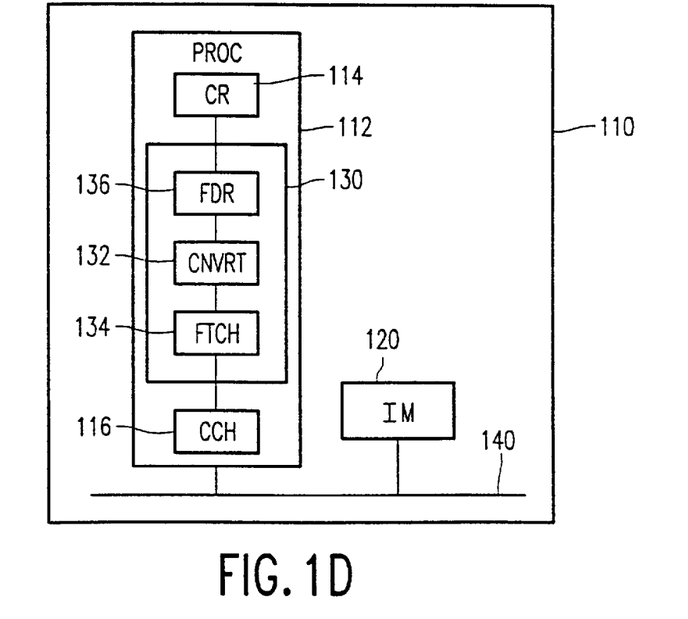

In FIG. 1D, the pre-processor 130 is embedded in the processor 112. The pre-processor 130 is preferably located between an instruction cache 116 of the processor 112 and the core 114. This configuration allows for optimal performance but, unlike the configurations of FIGS. 1A, 1B and 1C, requires changes to the microcontroller 110 and, as such, the pre-processor 130 can not as an off-the-shelf design be used for different types of processors with the same type of core 114.

Figure 2:
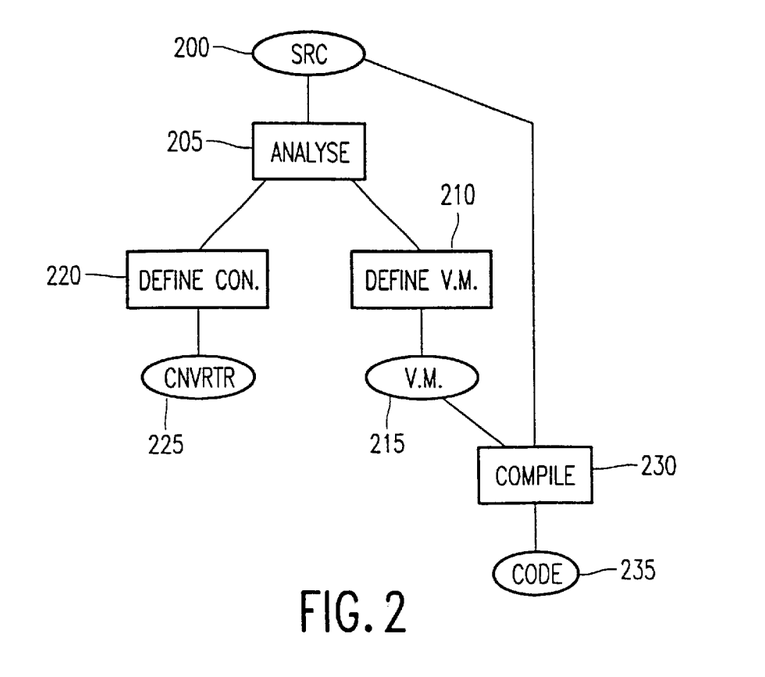
FIG. 2 illustrates the process of defining the virtual machine and associated converter.

In a pre-processing step, a program-specific virtual machine with a corresponding set of virtual machine instructions is defined for the program statements of a source program, which needs to be executed by the processing unit 100. Furthermore, for the program-specific virtual machine an associated converter 132 is defined for converting virtual machine instructions into native instructions of the microcontroller core. The converter 132 provides for each of the virtual machine instructions one or, usually, a sequence of corresponding native instructions required for executing the virtual machine instruction of the native core 114. FIG. 2 illustrates the process of defining the virtual machine and associated converter. In step 205 the source program 200 is analysed. Based on the analysis (e.g., frequency of occurrence of operations), in step 210 a program-specific virtual machine 215 is defined. In step 220 for the virtual machine an associated converter 225 is defined and in step 230 the source program is expressed in instructions of the virtual machine resulting in code 235. The virtual machine is defined such that the code requires less storage space in the instruction memory compared to using only native instructions for expressing the program statements.

Preferably, the program-specific virtual machine is defined by translating the program to virtual machine instructions of a predetermined virtual machine. As a starting point a virtual machine, such as a stack machine, is chosen which is known to give a compact representation. Due to the fact that a stack machine does not use explicit registers for storing operands, but instead operands are stored on the stack and operators always act on top element(s) of the stack, the number of operands which can be used is less restricted and management of the operands is simpler for a stack machine. This makes it easier to build a compiler for a stack based machine than for a register based machine. Furthermore, stack machine instructions tend to have a simpler structure than most register based machines. However, it will be appreciated that also a suitable register based machine may be used. To illustrate the invention, the stack machine of Annex A is used. A sample program (which solves the eight queens problem) written in the "C" programming language is shown in Annex B. The translation of the program to stack code of the virtual machine of Annex A is shown in Annex C. By analysing the code, frequently occurring sequences of instructions are identified and additional virtual machine instructions are defined, each representing one of the identified sequences. Annex D shows a list of suitable additional machine instructions. Such an additional machine instruction can be seen as a "super virtual machine instruction". The program specific virtual machine is then formed by the basic instructions of Annex A in combination with the superinstructions of Annex D. Annex E shows the expression of the program of Annex B into the virtual machine of Annex A and D. Next, for the program-specific virtual machine an associated converter 132, as shown in FIG. 1, is defined for converting virtual machine instructions into native instructions of the microcontroller core. The converter 132 provides for each of the virtual machine instructions (in the example, for the combination of the instructions in Annex A and D) one or, usually, a sequence of corresponding native instructions required for executing the virtual machine instruction on the native core 114. Using this approach, compaction of the code is achieved by using relatively few virtual machine instructions (in the example, 38 basic instructions and 40 super instructions) allowing a short representation (e.g., 7 bits) for each non-parameterised instruction, compared to 16 or 32 bits usually used for representing native instructions. The use of the superinstructions also results in requiring fewer instructions to represent the program. In the example, expressing the program in the instruction of the basic virtual machine requires 356 statements. Using superinstructions reduces this to requiring 262 statements. This compares favourably to the situation where the program is expressed in native instructions, where for a MIPS processor 608 statements are required.

Preferably, a program specific virtual machine is defined in the following way. The source program is converted to an intermediate level representation of so-called expression trees based on a predetermined virtual machine. An expression tree is constructed of nodes representing basic operations of the virtual machine. The expression tree represents the computation resulting from performing the basic operations of the nodes of the tree in a given sequence (e.g., postfix order). The conversion of the program to expression trees may be performed using the parsing phase of a compiler, such as the 'light "C" compiler 1 cc' of Fraser and Hanson. Next the expression trees and coherent tree fragments (representing a sequence of operations) are identified. Each of the trees and fragments is a candidate to be represented by a superinstruction. Starting from the basic virtual machine instructions, the tree or tree fragment which gives most savings in code size is represented by a superinstruction. The superinstruction is added to the virtual machine. The program is expressed in the new set of virtual machine instructions to determine the saving. New superinstructions are added as long as still room is available for adding new instructions (e.g., if the virtual machine instructions need to be stored as bytes, the number of instructions is limited to 256) or until no saving are achieved any more. Finally, the source program is expressed in instructions of the program-specific virtual machine and conversion data is generated.

Once the program has been expressed in virtual machine instructions, the resulting code is stored in the instruction memory 120. For embedded systems, the code is usually stored in a ROM, which is mask-programmed, or a programmable ROM, such as a PROM or (E)EPROM. Similarly, the generated conversion data is represented in the converter 132 of the processing unit 100. The converter 132 may, for instance, be implemented using a conversion table or microcode stored in ROM. The converter 132 may also be implemented using logic, such as a PLD. For a re-programmable converter the same approach can be used based on the respective re-programmable techniques, such as (E)EPROM or E-PLD.

Figure 3:
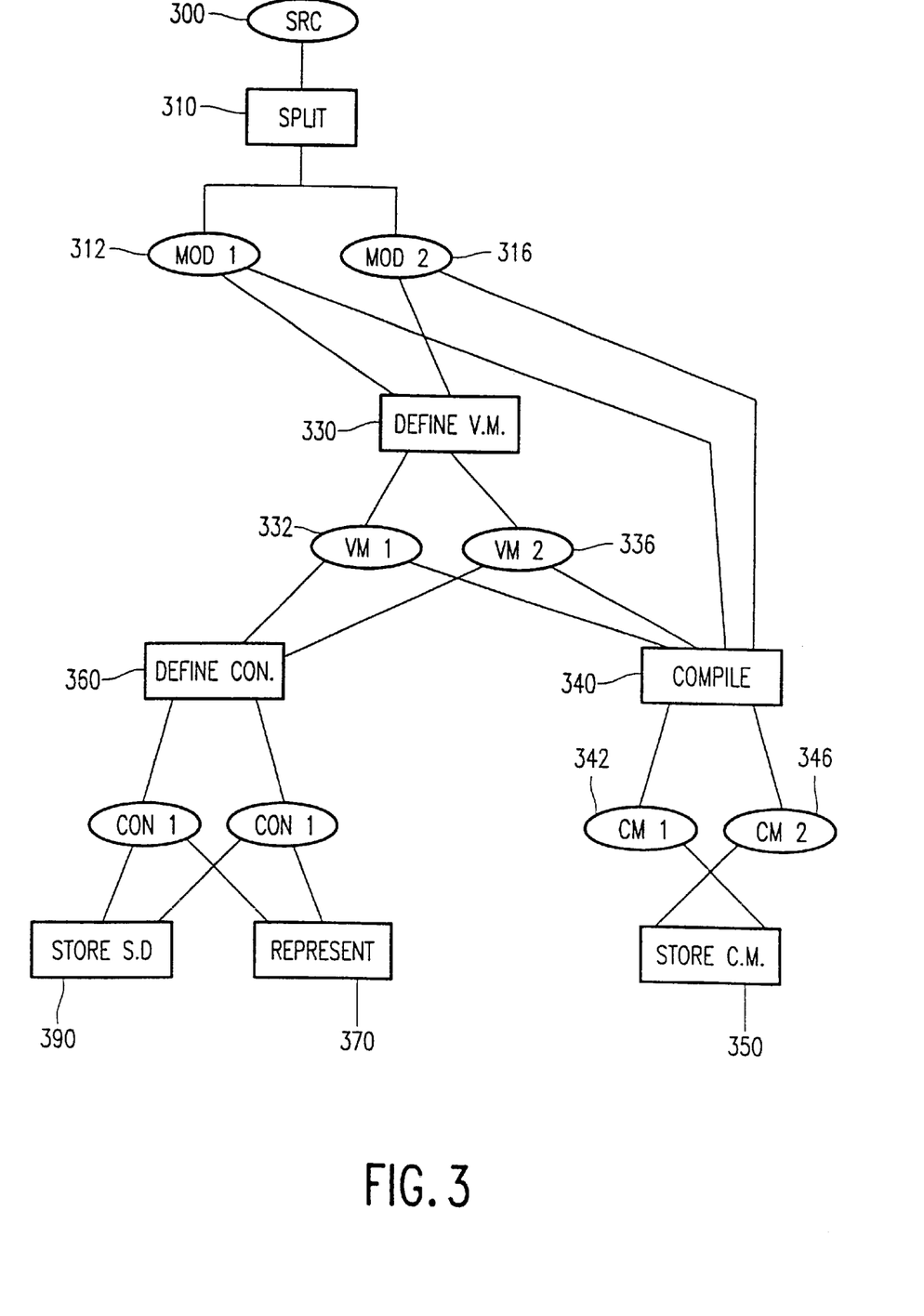
FIG. 3 illustrates the process for a program formed of several coherent groups of program statements.

FIG. 3 illustrates a further embodiment according to the invention, wherein the source program 300, e.g., programmed in "C", is split in step 310 into several coherent groups of program statements, such as program modules, objects or task-specific code. Shown are modules 312 and 316. It will be appreciated that no explicit splitting may be required and the source program may already be available in a suitable modular organisation. For each of the groups 312 and 316, a program group specific virtual machine is defined (step 330) with a corresponding set of virtual machine instructions in a way similar to steps 205 and 210 of FIG. 2. Shown are the respective virtual machines 332 and 336. In step 340, the program statements of the groups 312 and 316 are expressed in instructions of the respective virtual machines 332 and 336, resulting in the respective code modules 342 and 346. The code modules are stored in the instruction memory 120 in step 350. In step 360 for the program group specific virtual machines 332 and 336 respective conversion means 362 and 366 are generated for converting virtual machine instructions into native instructions of the microcontroller core. In step 370, the conversion means 362 and 366 are represented in the processing unit 100, for instance by programming a conversion table or logic in the processing unit 100. As a consequence, the converter 132 comprises a specific conversion means for each of the program groups. To enable the processing unit 100 to select the group-specific conversion means associated with a fetched virtual instruction, in step 390 selection data is stored in the processing unit. During execution a virtual machine instruction is fetched from the instruction memory 120. The selection data is then used to locate the conversion means associated with the virtual machine to which the virtual machine instruction belongs.

Figure 4:
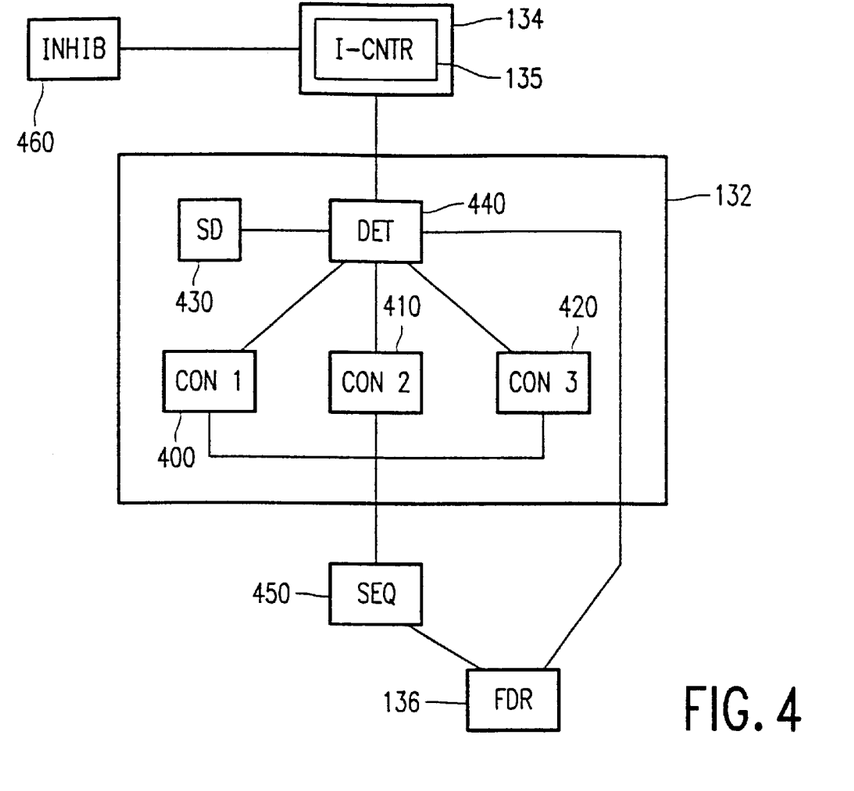
FIG. 4 shows a block diagram of the converter.

FIG. 4 shows a block diagram of the converter 132 wherein the converter 132 comprises several conversion means (shown are 400, 410 and 420). Each of the conversion means is used for converting virtual machine instructions of a specific virtual machine. It will be appreciated that the converter 132 may comprise fully autonomous conversion means, each capable of performing the full conversion. Alternatively, the converter 132 may use some shared logic under control of separate conversion data (such as a table) for each of the virtual machines. The processing unit 100 comprises the selection data 430. The selection data may be represented in any suitable way, e.g., stored in the instruction memory 120 or, if the conversion means is stored (partly) as data, stored in combination with the conversion means. The selection data 430 may also take the form of a register in the converter 132 loaded from a memory. Various forms of selection data may be used.

In a further embodiment, the address range of the instruction memory 120 is divided into several sub-ranges. An address sub-range is reserved for storing virtual machine instructions of only one virtual machine. Preferably, an address sub-range is also reserved for storing native instructions. Such native instructions may, for instance, be used to initialise the system or to allow certain software modules, such as drivers or special parts of the embedded software application, to be compiled to native instructions for optimal performance. In this embodiment the selection data indicates for each of the defined address sub-ranges which one of the conversion means 400, 410 or 420 should be used for converting an instruction fetched by the instruction fetcher 134 to native instructions. To this end, the converter 132 comprises a detector 440 for selectively directing an instruction fetched from a location in the instruction memory 120 to one of the conversion means 400, 410 or 420, based on the selection data. If also native instructions are stored in the instruction memory 120, the detector 440 ensures that these instructions are directly supplied to the feeder 136 for supply to the microcontroller core 114.

As an alternative to basing the decision on the address of the fetched instruction, the information may also be stored in direct association with the instruction. For instance one or more bits of each entry in the instruction memory 120 may be reserved to differentiate between virtual machines and/or between native code or virtual code. For instance, if only two virtual machines are used, where the instructions require 7 bit, an eighth bit can be used to indicate the virtual machine to which the instruction belongs and the associated conversion means. Obviously, this technique may be combined with differentiating based on addresses.

As a further alternative, the selection data may be stored in a register where the register is set to indicate a different conversion means each time a switch occurs between virtual machines. To set the register a special instruction (e.g., a form of a jump instruction) may be used. Such implementation-supporting instructions can be mixed with the virtual machine/native instructions in the instruction memory.

As described above, typically a virtual machine instruction is converted to a sequence of native instructions. To regulate the supply of instructions to the core, the processing unit 100 comprises a sequencer 450 coupled in between the converter 132 and the microcontroller core 114 for sequentially feeding the sequence of native instructions to the microcontroller core 114. The sequencer 450 may be implemented using conventional components, such as a counter, which may, for instance, be incremented as a result of a trigger from the microcontroller core indicating that a new instruction is required (e.g., an increment of the instruction counter of the core). In a conventional processing unit, a change of the instruction pointer (also referred to as program counter) of the microcontroller core results in the fetcher 134 fetching an instruction from the instruction memory 120 and the feeder 136 supplying the instruction to the microcontroller core 114. To break the link between automatically fetching and feeding, the processing unit 100 further comprises inhibiting means 460 for inhibiting fetching an instruction from the instruction memory during the feeding of the sequence.

It will be appreciated that the sequencing and inhibiting may be performed in several ways. In a further embodiment, the inhibiting means 460 is operative to perform the inhibiting by obstructing an increment of the instruction pointer of the microcontroller core 114. This may require a small modification to the core 114. For instance, an additional control line into the core 114 may allow selective inhibiting of the instruction counter, where the inhibiting means 460 inhibits the increment whenever instructions from the sequence are being supplied and enables an increment when a sequence has been fully supplied.

In an alternative embodiment, the instruction fetcher 134 maintains its own instruction counter 135, separate from the instruction pointer of the microcontroller core 112. The inhibiting means 460 controls when an increment (or more general a change) of the instruction pointer of the microcontroller results in a change of the instruction counter 135 of the instruction fetcher 134. Similar as described above, the inhibiting means 460 inhibits a change of the instruction counter 135 whenever instructions from the sequence are being supplied and enables a change when a sequence has been fully supplied. As a result of a change of the instruction counter 135, the instruction fetcher 134 will normally fetch a new instruction from the instruction memory 112, from an address indicated by the instruction counter. Advantageously, particularly in view of the compact representation of virtual machine instructions, the instruction fetcher 134 may fetch several instructions from the memory in one read operation (e.g., four one-byte instructions may be read as one 32-bit word). In this way, not every change of the instruction counter 135 needs to result in actually fetching a new instruction.

In a further embodiment according to the invention, a program module expressed in virtual machine instructions of a further virtual machine is received, e.g., via a network or from a local background memory. An example of such a program module is a Java applet. The received program module is stored in the instruction memory 120. To enable conversion of the further virtual machine instructions into native instructions also conversion data is received. The conversion data may for instance specify a conversion table for a table based conversion means or E-PLD programming data for a PLD based conversion means. The conversion data is stored in the processing unit for subsequent use by a further conversion means of the converter 132. To be able to select the appropriate conversion means during execution, also selection data is stored in the processing unit associating each further virtual machine instruction with the conversion data. During execution, for a fetched further virtual machine instruction the further conversion means is operated under control of the conversion data indicated by the selection data.

Figure 5:
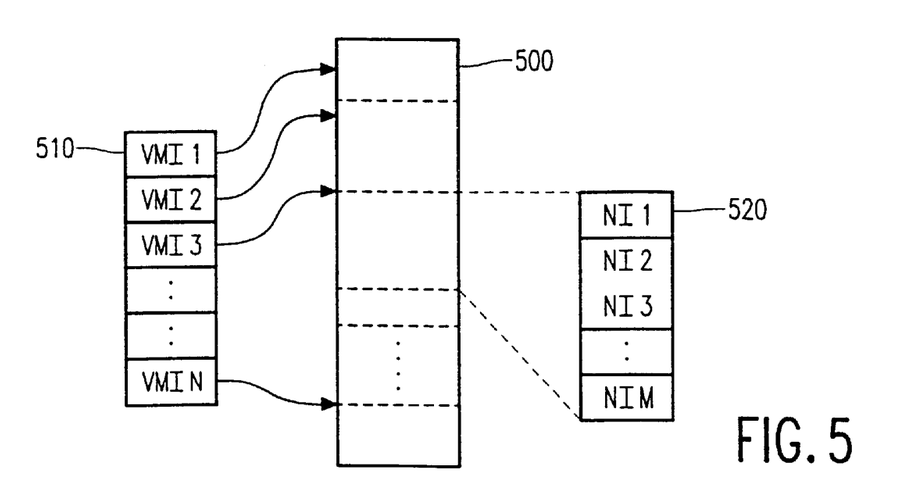

As described above, the converter 132 may comprise a table for converting a virtual machine instruction to a sequence of native instructions. A one dimensional table may be used, where each cell of the table comprises a sequence of native instructions for one corresponding virtual machine instruction. The cell number may correspond to the value of the corresponding virtual machine instruction. As an example, the sequence of native instructions for the Java integer addition (0x60) may be located in cell 96 (=0x60 in hexadecimal notation). Since the length of the sequence of native instructions may vary considerably for the various virtual instructions, preferably the sequences are located in a one-dimensional table without any explicit cells where the sequences immediately follow each other. Such a translation table 500 is shown in FIG. 5, where the implicit cell boundaries are indicated using dotted lines. In order to be able to locate a sequence for a virtual machine instruction a code index table 510 may be used, which for each virtual machine instruction (VMI 1 to VMI N) indicates the starting point of the corresponding sequence in the translation table 500. For the cell of the translation table 500 which corresponds to VMI 3 the related sequence 520 of native instruction NI 1 to NI M are shown.

A further example of a conversion is given for the Java byte code bipush n (used for sign extending byte n and placing the result on top of the stack). This virtual machine instruction consists of two bytes {0x16 and n}, where the first byte specifies the operation and the second byte provides the parameter n. The instruction may be converted to the following sequence of native MIPS instructions:

| | |
|---|---|
| ori $a0, $0, n | /* Load register $a0 with constant n */ |
| sll $a0, $a0, 24 | /* Shift left by 24 bits */ |
| sra $a0, $a0, 24 | /* Arithmetic shift right, causing sign extension, by /* replicating last left-most bit */ |
| sw $a0, 0 ($tosp) | /* Store result at new top of stack */ |
| addi $tosp, −4 | /* Increment stack size */ |

This example illustrates that a virtual machine instruction may be parameterised, where an operation code is followed by at least one operand. Advantageously, the converter 132 comprises a conversion table 500, where native instructions are represented either by the full code or by an instruction skeleton. As an example, the instruction addi $tosp, −4 (last instruction of the sequence of the previous example) contains no variable parts and may be located in full as a 4-byte entry in the table. The instruction ori $a0, $0, n (first instruction of the sequence of the previous example) contains a variable part and may be located in the table as a skeleton, not specifying the variable part (being n). Preferably, the entry in the table for an instruction skeleton is the same width as a full instruction (e.g., 4-bytes for a MIPS processor), allowing a uniform table. Further information may be located in the table (or in separate table(s)) for indicating how the unspecified part of the native instruction skeleton should be filled in. Advantageously, microprogramming is used to fill in the unspecified parts. The further information may then comprise or indicate micro code. It will be appreciated that it is advantageous to use for an instruction skeleton a same structure (width and composition) as for a full native instruction. However, other structures may be used as well.

If the virtual machine is a stack oriented machine, preferably the stack or at least the top elements of the stack are mapped onto registers of the microcontroller 110. In this way the memory stack (with the virtual machine stack) is mapped to the register stack. Assuming that registers $r1, $r2 and $r3 contain three successive elements of the memory stack, where initially $r1 corresponds to the first empty location of the memory stack (above the top of the stack), $r2 contains the top of the memory stack, and $r3 contains the second element of the memory stack, the Java byte code bipush n may be converted to the following sequence of native MIPS instructions:

ori $r1, $0, n sll $r1, $r1, 24

$sra $r1, $r1, 24

After this operation, $r1 contains the top of the memory stack. Similarly, the Java byte code (a virtual machine instruction) for integer addition (0x60) may be converted to the following sequence of MIPS instructions, starting from the same position where initially $r1 corresponds to the first empty location of the memory stack (above the top of the stack), $r2 contains the top of the memory stack, and $r3 contains the second element of the memory stack:

add $r3, $r2, $r3

After this operation, $r3 contains the top of the memory stack.

In above examples, preferably the position of the top of the memory stack (i.e., which register contains the top of the memory stack) is indicated using a register 138 of the converter 132. The converter uses the register 138, referred to as the Register Stack Pointer (RSP), to generate the appropriate native instructions. Preferably, microprogramming is used to specify the register operands of the native instructions. In this way also fixed native instructions have become variable, since the register operands need to be specified by the converter 132. Preferably, such operands are also stored in the translation table 500 using instruction skeletons. Assuming that RSP points to the first free register, the Java byte code bipush n may be converted to the following sequence of native MIPS instructions under control of the corresponding micro code:

| Micro code | Instructions |
|---|---|
| rsp - = 1; $f_{tg}$ = rsp + 1 | ori $(rsp + 1), $0, n |
| $f_{tg}$ = rsp + 1; $f_{ao}$ = rsp + 1 | sll $(rsp + 1), $(rsp + 1), 24 |
| $f_{tg}$ = rsp + 1; $f_{ao}$ = rsp + 1 | sra $(rsp + 1), $(rsp + 1), 2 | where $f_{tg}$ indicates the target register for the instruction, and $f_{a0}$, and $f_{a1}$ indicate the first and, respectively, second argument register for the instruction. A following Java byte code iadd for adding the two top elements of the stack would result in the following micro code and instruction:

$f_{tg}$=rsp+2; $f_{aO}$=rsp+2; $f_{a1}$=rsp+1; rsp+=1 add $(rsp+2), $(rsp+1)

Annex A. Basic Virtual Machine Instructions

| Operator | Type Suffixes | Operation |
|---|---|---|
| ADDRF | P | address of a parameter |
| ADDRG | P | address of a global |
| ADDRL | $F^1$ | address of a local |
| CNST | CSIUPFD | constant |
| BCOM | U | bitwise complement |
| CVC | IU | convert from char |
| CVD | IF | convert from double |
| CVF | D | convert from float |
| CVI | CSUD | convert from int |
| CVP | U | convert from pointer |
| CVS | IU | convert from short |
| CVU | CSIP | convert from unsigned |
| INDIR | CSIPFDB | fetch |
| NEG | IFD | negation |
| ADD | IUPFD | addition |
| BAND | U | bitwise AND |
| BOR | U | bitwise inclusive OR |
| BXOR | LT | bitwise exclusive OR |
| DIV | IUFD | division |
| LSH | IU | left shift |
| MOD | IU | modulus |
| MUL | IUFD | multiplication |
| RSH | IU | right shift |
| SUB | IUPFD | subtraction |
| ASGN | CSIPFDB | assignment |
| EQ | IFD | jumpi if equal |
| GE | IUFD | jump if greater than or equal |
| GT | IUFD | jumpi if greater than |
| LE | IUFD | jump if less than or equal |
| LT | IUFD | jump if less than |
| NE | IUFD | jump if not equal |
| ARG | IPFDB | argument |
| CALL | IFDBV | function call |
| RET | IFD | return from function |
| JUMP | V | unconditional jump |
| LABEL | V | definition |
| ADDSP | | increment stack pointer |
| POP | | pop stack |
| Suffix | | |
| B | Boolean | |
| C | Char | |
| D | Double | |
| I | Integer | |
| F | Floating point | |
| P | Pointer | |
| S | Short | |
| U | Unsigned integer | |
| V | Label | |

Annex B. Sample "C" program

```
int up[15], down[15], rows[8], x[8];
int queens(), print();
main()
{
    int i;
    {
        char *i;
        printf ("%s", i);
    }
    for (i = 0; i < 15; i++)
        up[i] = down[i] = 1;
    for (i = 0; i < 8; i++)
        rows[i] = 1
    queens(0);
    return 0;
}
queens(c)
{
    int r;
    for (r = 0; r < 8; r++)
```

-continued

```
          if (rows[r] && up[r−c+7] && down[r+c]) {
              rows[r] = up[r−c+7] = down[r+c] = 0;
              x[c] = r;
              if (c == 7)
                  print();
              else
                  queens(c + 1);
              rows[r] = up[r−c+7] = down[r+c] = 1;
          }
    }
}
print()
{
    int k;
    for (k = 0; k < 8; k++) printf ("%c", x[k] + '1');
    printf(" ");
}
```

C. Sample Program Expressed in Default Virtual Machine

| 1 | .text | 30 | addp | 59 | addrlp(−4) |
|---|---|---|---|---|---|
| 2 | addrgp(_main) | 31 | addrlp(−12) | 60 | indiri |
| 3 | jumpv | 32 | indiri | 61 | cnsti(1) |
| 4 | .globl_main | 33 | asgni | 62 | addi |
| 5 | _main: | 34 | L.3: | 63 | asgni |
| 6 | addSP (−12) | 35 | addrlp(−4) | 64 | addrlp(−4) |
| 7 | addrlp(−4) | 36 | addrlp(−4) | 65 | indiri |
| 8 | cnsti(0) | 37 | indiri | 66 | cnsti(8) |
| 9 | asgni | 38 | cnsti(1) | 67 | lti(L.6) |
| 10 | L.2: | 39 | addi | 68 | cnsti(0) |
| 11 | addrlp(−8) | 40 | asgni | 69 | argi |
| 12 | addrlp(−4) | 41 | addrlp(−4) | 70 | addrgp(_queens) |
| 13 | indiri | 42 | indiri | 71 | calli |
| 14 | cnsti(2) | 43 | cnsti(15) | 72 | addSP(4) |
| 15 | lshi | 44 | lti(L.2) | 73 | pop |
| 16 | asgni | 45 | addrlp(−4) | 74 | cnsti(0) |
| 17 | addrlp(−12) | 46 | cnsti(0) | 75 | ret |
| 18 | cnsti(1) | 47 | asgni | 76 | L.1: |
| 19 | asgni | 48 | L.6: | 77 | cnsti(99) |
| 20 | addrlp(−8) | 49 | addrlp(−4) | 78 | ret |
| 21 | indiri | 50 | indiri | 79 | .globl_queens |
| 22 | addrgp(_down) | 51 | cnsti(2) | 80 | _queens: |
| 23 | addp | 52 | lshi | 81 | addSP (−52) |
| 24 | addrlp(−12) | 53 | addrgp(_rows) | 82 | addrlp(−4) |
| 25 | indiri | 54 | addp | 83 | cnsti(0) |
| 26 | asgni | 55 | cnsti(1) | 84 | asgni |
| 27 | addrlp(−8) | 56 | asgni | 85 | L.13: |
| 28 | indiri | 57 | L.7: | 86 | addrlp(−8) |
| 29 | addrgp(_up) | 58 | addrlp(−4) | 87 | addrlp(−4) |
| 88 | indiri | 119 | addrgp(_up + 28) | 150 | addrlp(−36) |
| 89 | asgni | 120 | addp | 151 | cnsti(0) |
| 90 | addrlp(−12) | 121 | indiri | 152 | asgni |
| 91 | cnsti(2) | 122 | addrlp(−16) | 153 | addrlp(−24) |
| 92 | asgni | 123 | indiri | 154 | indiri |
| 93 | addrlp(−16) | 124 | eqi(L.17) | 155 | addrlp(−28) |
| 94 | cnsti(0) | 125 | addrlp(−8) | 156 | indiri |
| 95 | asgni | 126 | indiri | 157 | addi |
| 96 | addrlp(−8) | 127 | addrlp(−20) | 158 | addrlp(−32) |
| 97 | indiri | 128 | indiri | 159 | indiri |
| 98 | addrlp(−12) | 129 | addi | 160 | lshi |
| 99 | indiri | 130 | addrlp(−12) | 161 | addrgp(_down) |
| 100 | lshi | 131 | indiri | 162 | addp |
| 101 | addrgp(_rows) | 132 | lshi | 163 | addrlp(−36) |
| 102 | addp | 133 | addrgp(_down) | 164 | indiri |
| 103 | indiri | 134 | addp | 165 | asgni |
| 104 | addrlp(−16) | 135 | indiri | 166 | addrlp(−24) |
| 105 | indiri | 136 | addrlp(−16) | 167 | indiri |
| 106 | eqi(L.17) | 137 | indiri | 168 | addrlp(−28) |
| 107 | addrlp(−20) | 138 | eqi(L.17) | 169 | indiri |
| 108 | addrfp(8) | 139 | addrlp(−24) | 170 | subi |
| 109 | indiri | 140 | addrlp(−4) | 171 | addrlp(−32) |
| 110 | asgni | 141 | indiri | 172 | indiri |
| 111 | addrlp(−8) | 142 | asgni | 173 | lshi |
| 112 | indiri | 143 | addrlp(−28) | 174 | addrgp(_up + 28) |
| 113 | addrlp(−20) | 144 | addrfp(8) | 175 | addp |
| 114 | indiri | 145 | indiri | 176 | addrlp(−36) |
| 115 | subi | 146 | asgni | 177 | indiri |
| 116 | addrlp(−12) | 147 | addrlp(−32) | 178 | asgni |
| 117 | indiri | 148 | cnsti(2) | 179 | addrlp(−24) |
| 118 | lshi | 149 | asgni | 180 | indiri |
| 181 | addrlp(−32) | 212 | addi | 243 | addrlp(−52) |
| 182 | indiri | 213 | argi | 244 | indiri |
| 183 | lshi | 214 | addrgp(_queens) | 245 | asgni |
| 184 | addrgp(_rows) | 215 | calli | 246 | addrlp(−40) |
| 185 | addp | 216 | addSP(4) | 247 | indiri |
| 186 | addrlp(−36) | 217 | pop | 248 | addrlp(−44) |
| 187 | indiri | 218 | L.22: | 249 | indiri |
| 188 | asgni | 219 | addrlp(−40) | 250 | subi |
| 189 | addrfp(8) | 220 | addrlp(−4) | 251 | addrlp(−48) |
| 190 | indiri | 221 | indiri | 252 | indiri |
| 191 | cnsti(2) | 222 | asgni | 253 | lshi |
| 192 | lshi | 223 | addrlp(−44) | 254 | addrgp(_up + 28) |
| 193 | addrgp(_x) | 224 | addrfp(8) | 255 | addp |
| 194 | addp | 225 | indiri | 256 | addrlp(−52) |
| 195 | addrlp(−4) | 226 | asgni | 257 | indiri |
| 196 | indiri | 227 | addrlp(−48) | 258 | asgni |
| 197 | asgni | 228 | cnsti(2) | 259 | addrlp(−40) |
| 198 | addrfp(8) | 229 | asgni | 260 | indiri |
| 199 | indiri | 230 | addrlp(−52) | 261 | addrlp(−48) |
| 200 | cnsti(7) | 231 | cnsti(1) | 262 | lshi |
| 201 | nei(L.21) | 232 | asgni | 263 | addrgp(_rows) |
| 202 | addrgp(_print) | 233 | addrlp(−40) | 264 | addrgp(_rows) |
| 203 | calli | 234 | indiri | 265 | addp |
| 204 | addSP(0) | 235 | addrlp(−44) | 266 | addrlp(−52) |
| 205 | pop | 236 | indiri | 267 | indiri |
| 206 | addrgp(L.22) | 237 | addi | 268 | asgni |
| 207 | jumpv | 238 | addrlp(−48) | 269 | L.17: |
| 208 | L.21: | 239 | indiri | 270 | L.14: |
| 209 | addrfp(8) | 240 | lshi | 271 | addrlp(−4) |
| 210 | indiri | 241 | addrgp(_down) | 272 | addrlp(−4) |
| 211 | cnsti(1) | 242 | addp | 273 | indiri |
| 274 | cnsti(1) | 305 | addSP(8) | 336 | .space 32 |
| 275 | addi | 306 | pop | 337 | .globl_down |
| 276 | asgni | 307 | L.38: | 338 | .align 4 |
| 277 | addrlp(−4) | 308 | addrlp(−4) | 339 | _down: |
| 278 | indiri | 309 | addrlp(−4) | 340 | .space 60 |
| 279 | cnsti(8) | 310 | indiri | 341 | .globl_up |
| 280 | lti(L.13) | 311 | cnsti(1) | 342 | .align 4 |
| 281 | L.12: | 312 | addi | 343 | _up: |
| 282 | cnsti(99) | 313 | asgni | 344 | .space 60 |
| 283 | ret | 314 | addrlp(−4) | 345 | .dataEnd |
| 284 | .globl_print | 315 | indiri | 346 | .data |
| 285 | _print: | 316 | cnsti(8) | 347 | .align 1 |
| 286 | addSP (−4) | 317 | lti(L.37) | 348 | L.42: |
| 287 | addrlp(−4) | 318 | addrgp(L.42) | 349 | .byte 10 |
| 288 | cnsti(0) | 319 | argp | 350 | .byte 0 |
| 289 | asgni | 320 | addrgp(_printf) | 351 | .align 1 |
| 290 | L.37: | 321 | calli | 352 | L.41: |
| 291 | addrlp(−4) | 322 | addSP(4) | 353 | .byte 37 |
| 292 | indiri | 323 | pop | 354 | .byte 99 |
| 293 | cnsti(2) | 324 | L.36: | 355 | .byte 32 |
| 294 | lshi | 325 | cnsti(99) | 356 | .byte 0 |
| 295 | addrgp(_x) | 326 | ret | 357 | .dataEnd |
| 296 | addp | 327 | .textEnd | | |
| 297 | indiri | 328 | .data | | |
| 298 | cnsti(49) | 329 | .globl_x | | |
| 299 | addi | 330 | .align 4 | | |
| 300 | argi | 331 | _x: | | |
| 301 | addrgp(L.41) | 332 | .space 32 | | |
| 302 | argp | 333 | .globl_rows | | |
| 303 | addrgp(_printf) | 334 | .align 4 | | |
| 304 | calli | 335 | _rows: | | |

Annex D Superinstructions

| | |
|---|---|
| 1 | instr112: ADDRLP[−4] |
| 2 | instr123I: INDIRI(ADDRLP[#]) |
| 3 | instr298: EQI[L.17](INDIRI(ADDP(*, *)), INDIRI(ADDRLP[−16])) |
| 4 | instr113: CNSTI[0] |
| 5 | instr133: CNSTI[1] |
| 6 | instr315: INDIRI(ADDRFP[8]) |
| 7 | instr124: CNSTI[2] |
| 8 | instr249U: ASGNI(ADDP(LSHI(*, *), ADDRGP[#]), *) |
| 9 | instr121: ADDRLP[−8] |
| 10 | instr132: ADDRLP[−12] |
| 11 | instr259U: LTI[#](INDIRI(ADDRLP[−4]),CNSTI[8]) |
| 12 | instr180: ASGNI(ADDRLP[−4]ADDI(INDIRI(ADDRLP[−4]), *)) |
| 13 | instr160: ASGNI(ADDP(*, ADDRGP[_down]), INDIRI(*)) |
| 14 | instr355: ADDRLP[−36] |
| 15 | instr471: ADDRLP[−52] |
| 16 | instr243: ASGNI(ADDP(LSHI(INDIRI(*), *), ADDRGP[_rows]), *) |
| 17 | instr352: ADDRLP[−24] |
| 18 | instr468: ADDRLP[−40] |
| 19 | instr354: ADDRLP[−32] |
| 20 | instr470: ADDRLP[−48] |
| 21 | instr514: ADDI(INDIRI(ADDP(*, ADDRGP[_x])), CNSTI[49]) |
| 22 | instr211: LTI[L.2](INDIRI(ADDRLP[−4]), CNSTI[15]) |
| 23 | instr313: ADDRLP[−20] |
| 24 | instr353: ADDRLP[−28] |
| 25 | instr461: NEI[L.21](INDIRI(ADDRFP[8]), CNSTI[7]) |
| 26 | instr469: ADDRLP[−44] |
| 27 | instr114: ASGNI(ADDRLP[−4], CNSTI[0]) |
| 28 | instr267: ADDRGP[_queens] |
| 29 | inst509: ADDRGP[_printf] |
| 30 | instr122: INDIRI(ADDRLP[−4]) |
| 31 | instr336: ADDRGP[_up+28] |
| 32 | instr146: INDIRI(ADDRLP[−8]) |
| 33 | instr147: ADDRGP[_down] |
| 34 | instr206: ADDRGP[_up] |
| 35 | instr219: ADDRGP[_rows] |
| 36 | instr276: ADDRLP[−16] |
| 37 | instr473: ADDRGP[_print] |
| 38 | instr474: ADDRGP[L.22] |
| 39 | instr515: ADDRGP[L.41] |
| 40 | instr523: ADDRGP[L.42] |

Annex E. Sample Program Expressed in Program-specific Virtual Machine

| | | | | | |
|---|---|---|---|---|---|
| 1 | .text | 31 | L.6: | 61 | asgni |
| 2 | addrgp(_main) | 32 | instr112 | 62 | instr276 |
| 3 | jumpv | 33 | instr124 | 63 | instr113 |
| 4 | .globl_main | 34 | instr133 | 64 | asgni |
| 5 | _main: | 35 | instr243 | 65 | instr146 |
| 6 | addSP (−12) | 36 | L.7: | 66 | instr132 |
| 7 | instr114 | 37 | instr133 | 67 | indiri |
| 8 | L.2: | 38 | instr180 | 68 | lshi |
| 9 | instr121 | 39 | instr259U(L.6) | 69 | instr219 |
| 10 | instr122 | 40 | instr113 | 70 | instr298 |
| 11 | instr124 | 41 | argi | 71 | instr313 |
| 12 | lshi | 42 | instr267 | 72 | instr315 |
| 13 | asgni | 43 | calli | 73 | asgni |
| 14 | instr132 | 44 | addSP(4) | 74 | instr146 |
| 15 | instr133 | 45 | pop | 75 | instr313 |
| 16 | asgni | 46 | instr113 | 76 | indiri |
| 17 | instr146 | 47 | ret | 77 | subi |
| 18 | instr132 | 48 | L.1: | 78 | instr132 |
| 19 | instr160 | 49 | cnsti(99) | 79 | indiri |
| 20 | instr146 | 50 | ret | 80 | lshi |
| 21 | instr206 | 51 | .globl_queens | 81 | instr336 |
| 22 | addp | 52 | _queens: | 82 | instr298 |
| 23 | instr132 | 53 | addSP (−52) | 83 | instr146 |
| 24 | indiri | 54 | instr114 | 84 | instr313 |
| 25 | asgni | 55 | L.13: | 85 | indiri |
| 26 | L.3: | 56 | instr121 | 86 | addi |
| 27 | instr133 | 57 | instr122 | 87 | instr132 |
| 28 | instr180 | 58 | asgni | 88 | indiri |
| 29 | instr211 | 59 | instr132 | 89 | lshi |
| 30 | instr114 | 60 | instr124 | 90 | instr147 |
| 91 | instr298 | 123 | addp | 155 | instr122 |
| 92 | instr352 | 124 | instr355 | 156 | asgni |
| 93 | instr122 | 125 | indiri | 157 | instr469 |
| 94 | asgni | 126 | asgni | 158 | instr315 |
| 95 | instr353 | 127 | instr352 | 159 | asgni |
| 96 | instr315 | 128 | instr354 | 160 | instr470 |
| 97 | asgni | 129 | indiri | 161 | instr124 |
| 98 | instr354 | 130 | instr355 | 162 | asgni |
| 99 | instr124 | 131 | indiri | 163 | instr471 |
| 100 | asgni | 132 | instr243 | 164 | instr133 |
| 101 | instr355 | 133 | instr315 | 165 | asgni |
| 102 | instr113 | 134 | instr124 | 166 | instr468 |
| 103 | asgni | 135 | instr122 | 167 | indiri |
| 104 | instr352 | 136 | instr249U(_x) | 168 | instr469 |
| 105 | indiri | 137 | instr461 | 169 | indiri |
| 106 | instr353 | 138 | instr473 | 170 | addi |
| 107 | indiri | 139 | calli | 171 | instr470 |
| 108 | addi | 140 | addSP(0) | 172 | indiri |
| 109 | instr354 | 141 | pop | 173 | lshi |
| 110 | indiri | 142 | instr474 | 174 | instr471 |
| 111 | lshi | 143 | jumpv | 175 | instr160 |
| 112 | instr355 | 144 | L.21: | 176 | instr468 |
| 113 | instr160 | 145 | instr315 | 177 | indiri |
| 114 | instr352 | 146 | instr133 | 178 | instr469 |
| 115 | indiri | 147 | addi | 179 | indiri |
| 116 | instr353 | 148 | argi | 180 | subi |
| 117 | indiri | 149 | instr267 | 181 | instr470 |
| 118 | subi | 150 | calli | 182 | indiri |
| 119 | instr354 | 151 | addSP(4) | 183 | lshi |
| 120 | indiri | 152 | pop | 184 | instr336 |
| 121 | lshi | 153 | L.22: | 185 | addp |
| 122 | instr336 | 154 | instr468 | 186 | instr471 |
| 187 | indiri | 213 | instr515 | 239 | .align 4 |
| 188 | asgni | 214 | argp | 240 | _rows: |
| 189 | instr468 | 215 | instr509 | 241 | .space 32 |
| 190 | instr470 | 216 | calli | 242 | .globl_down |
| 191 | indiri | 217 | addSP(8) | 243 | .align 4 |
| 192 | instr471 | 218 | pop | 244 | _down: |
| 193 | indiri | 219 | L.38: | 245 | .space 60 |
| 194 | instr243 | 220 | instr133 | 246 | .globl_up |
| 195 | L.17: | 221 | instr180 | 247 | .align 4 |
| 196 | L.14: | 222 | instr259U(L.37) | 248 | _up: |
| 197 | instr133 | 223 | addrgp(L.42) | 249 | .space 60 |
| 198 | instr180 | 224 | argp | 250 | .dataEnd |
| 199 | instr259U(L.13) | 225 | instr509 | 251 | .data |
| 200 | L.12: | 226 | calli | 252 | .align 1 |
| 201 | cnsti(99) | 227 | addSP(4) | 253 | L.42: |
| 202 | ret | 228 | pop | 254 | .byte 10 |
| 203 | .globl_print | 229 | L.36: | 255 | .byte 0 |
| 204 | _print: | 230 | cnsti(99) | 256 | .align 1 |
| 205 | addSP(−4) | 231 | ret | 257 | L.41: |
| 206 | instr114 | 232 | .textEnd | 258 | .byte 37 |
| 207 | L.37: | 233 | .data | 259 | .byte 99 |
| 208 | instr122 | 234 | .globl_x | 260 | .byte 32 |
| 209 | instr124 | 235 | .align 4 | 261 | .byte 0 |
| 210 | lshi | 236 | _x: | 262 | .dataEnd |
| 211 | instr514 | 237 | .space 32 | | |
| 212 | argi | 238 | .globl_rows | | |

What is claimed is:

1. A method for executing a source program on a processing unit comprising a predetermined microcontroller core for executing native instructions from a predetermined set of micro-controller specific instructions; the method comprising:

a pre-processing step of expressing program statements of the source program in a sequence of instructions comprising virtual machine instructions; and storing the sequence of instructions in an instruction memory; and an execution step of:
fetching instructions from the instruction memory;
using conversion means of the processing unit to convert virtual instructions fetched from the instruction memory into native instructions; and
feeding the native instructions to the microcontroller core for execution;

wherein the pre-processing step comprises the steps of:
defining for the program statements of the source program a program-specific virtual machine with a corresponding set of virtual machine instructions, such that the expression of the program statements in the sequence of instructions requires less storage space in the instruction memory compared to using only native instructions for expressing the program statements;
defining for the program-specific virtual machine an associated conversion means for converting virtual machine instructions of the program-specific virtual machine into native instructions of the microcontroller core; and
implementing the associated conversion means in the processing unit for a plurality of different virtual machines.

2. A method for executing a source program on a processing unit as claimed in claim 1, wherein:
the pre-processing step comprises the steps of:
identifying a plurality of groups of program statements in the source program;
for each of the groups of program statements:
defining a program group specific virtual machine with a corresponding set of virtual machine instructions;
generating for the program group specific virtual machine an associated conversion means for converting virtual machine instructions into native instructions of the microcontroller core;
implementing the associated conversion means in the processing unit; and
storing selection data in the processing unit associating each generated virtual machine instruction with the group-specific conversion means; wherein the execution step comprises the step of selecting for a fetched instruction the associated conversion means indicated by the selection data.

3. A method as claimed in claim 1, characterised in that the method comprises:
receiving an instruction module comprising instructions including virtual machine instructions of a further virtual machine, and receiving conversion data enabling a further conversion means of the processing unit to convert the further virtual machine instructions into native instructions;
storing the instruction module in the instruction memory;
storing the conversion data in the processing unit;
storing selection data in the processing unit associating each further virtual machine instruction with the conversion data; wherein the execution step comprises the steps of:
selecting for a fetched further virtual machine instruction the associated conversion data indicated by the selection data; and
operating the further conversion means under control of the selected conversion data.

4. A processing unit for executing instructions of a virtual machine, the instructions being referred to as virtual machine instructions; the processing unit comprising:
a predetermined microcontroller core for executing native instructions from a predetermined set of microcontroller specific instructions; the native instructions being different from the virtual machine instructions;
an instruction memory for storing instructions including at least one of the virtual machine instructions;
a converter comprising conversion means for converting a virtual machine instruction fetched from the instruction memory into at least one native instruction for execution by the microcontroller core by defining for program statements of the source program a program-specific virtual machine with a corresponding set of virtual machine instructions, and defining for the program-specific virtual machine an associated conversion means for converting virtual machine instructions of the program-specific virtual machine into native instructions of the microcontroller core; and
wherein the converter is operative to perform the conversion for a plurality of different virtual machines.

5. A processing unit as claimed in claim 4, wherein the conversion means is of a re-programmable type.

6. A processing unit as claimed in claim 4, wherein the converter comprises conversion means for each one of the plurality of the virtual machines for converting virtual machine instructions of the corresponding virtual machine.

7. A processing unit as claimed in claim 6, wherein the processing unit comprises selection data associating at least two disjunct groups of locations in the instruction memory with respective conversion means, and wherein the converter comprises a detector for selectively directing an instruction fetched from a location in the instruction memory to conversion means based on the selection data.

8. A processing unit as claimed in claim 4, wherein the processing unit is operative to fetch for an instruction associated selection data from a memory for differentiating between the native and the virtual machine and/or between different virtual machines; and wherein the converter comprises a detector for selectively directing the fetched instruction to conversion means in dependence on the selection data.

9. A processing unit as claimed in claim 4, wherein the converter is operative to convert a single virtual machine instruction into a single corresponding native instruction, where the virtual machine instruction is coded more compactly with respect to requiring storage space in the instruction memory than the corresponding native instruction.

10. A processing unit as claimed in claim 4, wherein the converter is operative to convert one virtual machine instruction into a predetermined sequence of a plurality of native instructions; and the processing unit comprises:
a sequencer coupled in between the converter and the microcontroller core for sequentially feeding the sequence of native instructions to the microcontroller core; and
inhibiting means for inhibiting fetching an instruction from the instruction memory during the feeding.

11. A processing unit as claimed in claim 10, wherein the inhibiting means is operative to perform the inhibiting by obstructing an increment of an instruction pointer of the microcontroller core.

12. A processing unit as claimed in claim 11, wherein processing unit comprises an instruction fetcher for fetching an instruction from the instruction memory in response to a change of an instruction counter of the instruction fetcher, where the instruction counter is set to a different value in response to a change of an instruction pointer of the microcontroller core, and the inhibiting means is operative to perform the inhibiting by obstructing a change of value of the instruction counter.

* * * * *